March 18, 1941.  L. A. WINTER  2,235,597
FISH LURE
Filed Nov. 3, 1938
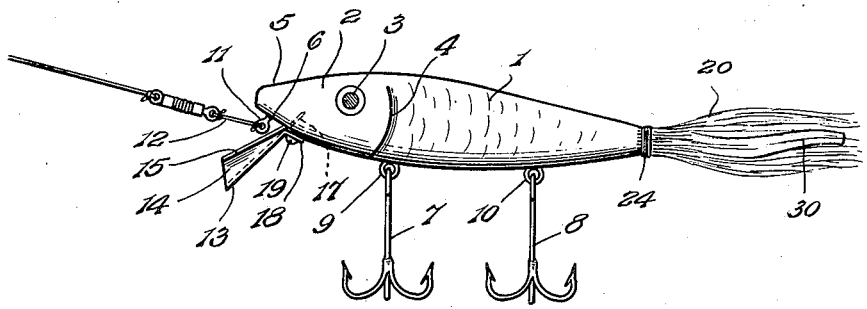
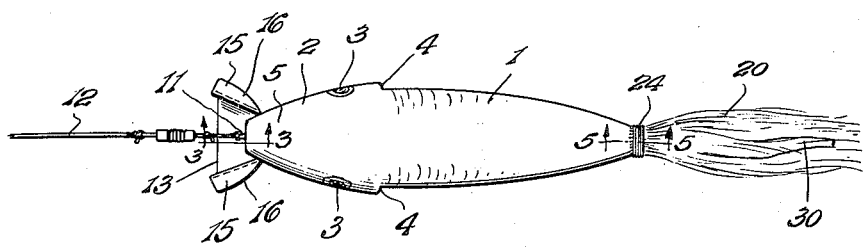
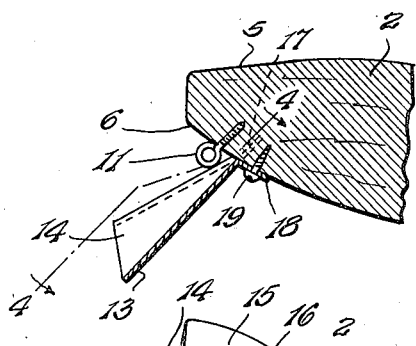
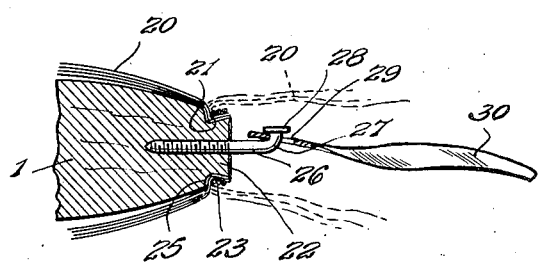
Inventor
L. A. Winter.
By Lacey & Lacey,
Attorneys Patented Mar. 18, 1941

2,235,597

UNITED STATES PATENT OFFICE 2,235,597

FISH LURE

Leon A. Winter, Mason City, Iowa

Application November 3, 1938, Serial No. 238,647

4 Claims. (Cl. 43—46)

This invention relates to an artificial bait or lure of the type used when fishing for game fish, and it is one object of the invention to provide an artificial bait or lure of such construction that, when it is drawn through the water, it will have movements closely resembling those of a live fish and readily attract the attention of larger fish which it is desired to catch.

Another object of the invention is to provide a bait of this character having at the front end of its body a deflector plate so located and extending from the under portion of the forward end of the body at such an angle that the bait when drawn through the water will have darting movements downwardly and upwardly as well as laterally.

It is another object of the invention to so mount the plate at the front of the body that it will be very firmly secured and prevented from working loose during use of the bait or bent out of its proper shape or angular relation to the body portion of the bait when placed in a packing box.

Another object of the invention is to provide the bait with a "bucktail" so secured to the rear end portion of the body that it will be very firmly held in place and prevented from working loose.

Another object of the invention is to so apply the bucktail to the rear end of the body that it will be disposed about a pin to which a bacon rind is to be applied and thus cause the bacon rind to be surrounded by the bucktail and together with the bucktail closely resemble the tail of a fish both in appearance and movement when the bait is drawn through the water.

The invention is illustrated in the accompanying drawing, wherein—

Figure 1 is a side elevation of the improved artificial bait or lure,

Figure 2 is a top plan view thereof,

Figure 3 is a sectional view taken through the forward end portion of the lure along the line 3—3 of Figure 2, Figure 4 is a sectional view taken along the line 4—4 of Figure 3, and Figure 5 is a sectional view taken through the rear portion of the lure along the line 5—5 of Figure 2.

The body 1 of the artificial bait or lure is shaped to resemble a fish, the head 2 being provided with eyes 3 and gills 4 and tapered to a blunt point at its front end. Upper and front surfaces 5 and 6 of the head are flat and wide in order to provide surfaces against which water may act to impart darting movements to the bait as it is drawn forwardly through the water.

Hooks 7 and 8 are suspended under the body by eyes 9 and 10 screwed into the body adjacent the head and the rear end of the body. A screw eye 11 for engagement by the line 12 is screwed into the flat under face of the head 2 adjacent the front end thereof.

A deflector plate 13, which is formed of sheet metal, extends forwardly from the flat under face of the head where it is secured back of the screw eye 11, and this plate is bent to form upstanding side flanges 14 provided with outwardly projecting lips 15 along their under edges. The plate 13 is gradually reduced in width towards its rear end between the side flanges or walls 14, as clearly shown in Figures 2 and 4, and the side flanges are gradually reduced in depth towards their rear ends where they are intersected by the curved and rearwardly sloping side edges 16 of the lip 15. This formation of the deflector together with the fact that it extends forwardly at a downward incline from the flat under face of the head back of the screw eye 11 to which the line is attached causes the bait or lure when drawn through the water to have darting movement laterally as well as vertically and impart movements which are very similar to those of a live fish. In order to firmly secure the deflector in engagement with the under face of the head, there have been provided prongs 17 and a tongue 18 located between the prongs. The prongs and the tongue are integral with the rear end of the deflector plate and the tongue is bent to extend rearwardly at such an angle to the plate that, when the prongs are embedded in the head, the tongue will be disposed flat against the flat under face 6 of the head where it is secured by a screw 19 passed through the tongue and into the head, as shown in Figure 3. The plate will, therefore, be very firmly secured and prevented from working loose or being bent out of its proper shape or angular relation to the head 2.

The "bucktail" 20 which extends from the rear end of the body 1 consists of a plurality of strands, such as hair or other fibrous material. These strands are initially disposed about the rear end portion of the body longitudinally thereof, as shown in Figure 5, and secured in the circumferentially extending recess about the forwardly tapered plug or wedge 22 formed thereby by a binding 23 which may be thread or a similar material found suitable for the purpose. After the strands have been secured in the circumferentially extending recess 21, they are shifted rearwardly so that they extend rearwardly from the body to form the bucktail 20 and they are again bound in the recess about the plug or wedge by a binding 24 of thread or the like. It will thus be seen that the forward end portion of the bucktail will be very firmly secured by a double binding, and as they are folded back upon themselves before the second or outer binding is applied, they cannot slip out of place. The fact that the bucktail is secured about the forwardly tapered wedge or plug 22 prevents the same from slipping rearwardly off the rear end of the body and as it has abutting engagement with the circumferentially extending shoulder 25 at the front of the recess or groove 21, it will be prevented from moving forwardly out of its proper position. A pin 26 is screwed into the rear end of the body and projects from the rear end of the body axially thereof, the rear end of the pin being bent upwardly, as shown at 27, and terminating in a flat head 28 adapted to be passed through the slit 29 formed in a bacon rind 30 and securely but removably hold the bacon rind in place where it will be surrounded by the bucktail.

When this artificial bait or lure is in use, the line 12 is tied through the screw eye 11 and passed into the water. As the bait or lure is drawn forwardly through the water during trolling or rewinding, the deflector plate and the flat upper and lower surfaces of the head 2 will cause the bait to have darting movement laterally and also up and down in the water very similar to the manner in which a fish moves and the bucktail will have movements imparted to it which are very similar to the movements of a fish's tail when propelling itself forwardly through the water. The fact that the deflector plate is secured by the prongs which are embedded in the head and by means of a screw pass through the tongue fitting flat against the flat under face of the head will cause this deflector plate to be very firmly held in place and prevented from being worked loose by water current or careless handling when placed in or removed from a packing box. The bacon rind may be very easily applied to the pin where it will be firmly held against accidental displacement, and since the bucktail is secured in the annular groove about the forwardly tapered plug or wedge at the rear end of the body, it will be prevented from shifting longitudinally out of its proper place about the rear end of the body and its strands prevented from working loose. A very good artificial bait or lure has thus been provided which is of a strong and durable construction and will closely resemble the movements of a live fish when in use.

Having thus described the invention, what is claimed as new is:

1. An artificial bait comprising a body having a tapered forward end portion formed with a flat under face extending forwardly at an upward incline, and a deflector plate extending forwardly from the flat under face at a downward incline and at its rear end being provided with prongs embedded in the body and a tongue between the prongs extending rearwardly from the plate in flat contacting engagement with the under face of the body, and a fastener passing through said tongue and into said body.

2. An artificial bait comprising a body having a tapered forward end portion formed with an under face extending forwardly at an upward incline, a deflector plate extending forwardly from the under face at a downward incline, anchoring means at the rear end of said plate embedded in said body, a tongue extending from the rear end of said plate in flat engagement with the under face, and a fastener extending through said tongue and into said body.

3. An artificial bait comprising a body, a deflector plate extending forwardly from the under face of the forward portion of said body at a downward incline, prongs extending from the rear end of said plate and embedded in said body, a tongue extending from the plate against the said under face of the body, and a fastener extending through said tongue and into said body.

4. An artificial bait comprising a body formed at its rear end with a circumferentially extending groove providing the body with a forwardly tapered wedge-shaped rear end and a circumferentially extending shoulder about the forward end of the wedge-shaped portion, strands extending rearwardly from the body about the wedge-shaped rear end portion thereof, a binding for securing said strands in said groove and firmly holding the same in place about the wedge-shaped portion and against said shoulder, and a pin carried by said body and projecting from the rear end thereof and having means at its outer rear end for engaging a bacon rind and supporting the rind in position to be surrounded by the strands.

LEON A. WINTER.